United States Patent
Rowe

(10) Patent No.: US 10,055,938 B2
(45) Date of Patent: *Aug. 21, 2018

(54) CROWD BASED BONUS AND PROMOTIONAL SYSTEM AND METHOD

(71) Applicant: Certus Technologies, Luxembourg (LU)

(72) Inventor: Rick Rowe, Las Vegas, NV (US)

(73) Assignee: Certus Technologies, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,290

(22) Filed: Nov. 7, 2016

(65) Prior Publication Data

US 2017/0053493 A1    Feb. 23, 2017

Related U.S. Application Data

(63) Continuation of application No. 14/882,186, filed on Oct. 13, 2015, now Pat. No. 9,524,613, which is a continuation of application No. 13/904,235, filed on May 29, 2013, now Pat. No. 9,189,920, which is a continuation of application No. PCT/US2011/001976, filed on Dec. 12, 2011.

(51) Int. Cl.
*G06F 17/00* (2006.01)
*G07F 17/32* (2006.01)
*G06Q 30/02* (2012.01)

(52) U.S. Cl.
CPC ..... *G07F 17/3255* (2013.01); *G06Q 30/0207* (2013.01); *G06Q 30/0235* (2013.01); *G07F 17/3206* (2013.01); *G07F 17/3211* (2013.01); *G07F 17/3237* (2013.01)

(58) Field of Classification Search
None
See application file for complete search history.

(56) References Cited

U.S. PATENT DOCUMENTS

| | | |
|---|---|---|
| 7,024,180 B2 | 4/2006 | Waters et al. |
| 7,769,632 B2 | 8/2010 | Giraud et al. |
| 2004/0266517 A1 | 12/2004 | Bleich et al. |
| 2005/0153773 A1 | 7/2005 | Nguyen et al. |
| 2006/0217185 A1 | 9/2006 | Cavagna |
| 2009/0118005 A1* | 5/2009 | Kelly ............... G07F 17/32 463/31 |
| 2009/0275399 A1 | 11/2009 | Kelly et al. |
| 2012/0108337 A1* | 5/2012 | Kelly ............... G07F 17/3209 463/37 |
| 2013/0102372 A1 | 4/2013 | Lutnick et al. |

(Continued)

OTHER PUBLICATIONS

PCT International Preliminary Report on Patentability for PCT/US2011/001976 dated Jun. 18, 2013, in 4 pages.

*Primary Examiner* — Ronald Laneau
(74) *Attorney, Agent, or Firm* — Weide & Miller, Ltd.

(57) ABSTRACT

A bonus and/or promotion system, such as for a casino or other retail location, includes one or more sensors for detecting the presence of one or more persons at a location and a bonus or promotion generator configured to generate and output bonuses or promotions based upon detected levels of persons in an area. The bonus or promotion generator may provide an output to existing audio and/or visual display devices of the location for announcing bonuses or promotions.

17 Claims, 7 Drawing Sheets

(56) References Cited

U.S. PATENT DOCUMENTS

| | | |
|---|---|---|
| 2013/0288782 A1 | 10/2013 | Hornick et al. |
| 2014/0094256 A1* | 4/2014 | Hilbert ................ G07F 17/3211 463/20 |
| 2014/0329574 A1 | 11/2014 | Walker et al. |
| 2015/0005047 A1 | 1/2015 | Acres |
| 2015/0221173 A1 | 8/2015 | Walker et al. |

\* cited by examiner

People Traffic Detection - Bonusing Promotion
EMBODIMENTS

Resort

Casino Floor        Indoor Mall

Retail Shop         Super Store

Carnival    Outdoor Mall    Fun Store
                            Video and
                            Other Games

FIGURE 4

Casino Floor

| From Quadrant | Sensors | Promotion | Bonus | Description | Time | Active Time | To Quadrant |
|---|---|---|---|---|---|---|---|
| B5 | 1, 2, 3 | 2 for 1 | none | noon promo | 60 min | 12:00 | A4 |
| C5 | 4, 5, 6 | 10% | none | promo | 60 min | 1:00 | Z1 |
| H15 | 7 | $5 | none | promo | 60 min | 6:00 | AA |
| C3 | 8 | $10 | none | promo | 60 min | 9:00 | K11 |
| K7 | 9 | 2 for 1 | none | promo | 60 min | 10:00 | B3 |
| W11 | 10 | free play | none | promo | 60 min | 1:00 | K7 |
| B2 | 11,12 | $5 | none | promo | 60 min | 2:00 | X4 |
| G7 | 13 | 1 free | none | promo | 60 min | 3:00 | P8 |
| A9 | 14 | free play | none | promo | 90 min | 4:00 | N9 |
| K10 | 15 | free night | none | promo | 60 min | 6:00 | A2 |
| X3 | 22 | $49 room | none | promo | 60 min | 3:31 | none |
| ZZ2 | 99 | Free buffet | none | promo | 60 min | 1:23 | none |
| L13 | 44 | none | $50 | bonus | 10 min | 4:55 | none |
| P6 | 65 | none | $100 | slot bonus | 60 min | 6:22 | W9 |
| W9 | 71 | none | $10 | table bonus | 60 min | 7:00 | none |
| T5 | 72 | none | 100 credit | 25cent slot | 5 min | 23:00 | none |
| N7 | 73 | none | $10000 | progressive | 60 min | 24:00 | B2 |
| M2 | 65 | none | $777 | random | 10 min | 12:00 | none |
| ... | | | | | | | |

System Configuration Example

FIGURE 7

CROWD BASED BONUS AND PROMOTIONAL SYSTEM AND METHOD

RELATED APPLICATION DATA

This application is a continuation of U.S. patent application Ser. No. 14/882,186, filed Oct. 13, 2015, which is a continuation of U.S. patent application Ser. No. 13/900,235, filed May 29, 2013, now U.S. Pat. No. 9,189,920, which is a continuation of and claims priority to PCT/US2011/001976, filed Dec. 12, 2011, which claims priority to U.S. Provisional Patent Application No. 61/423,494, filed Dec. 15, 2010.

FIELD OF THE INVENTION

The invention relates generally to consumer based bonusing and promotions and in particular to casino based bonusing and promotions.

BACKGROUND OF THE INVENTION

Bonuses or promotions have long been used to increase consumer interest in retail products or services, or to attract consumers to particular retail locations. Very often bonuses and promotions are directly tied to an affinity card in order to establish some criteria to award the bonus or generate the promotion. However, the use of these cards has numerous drawbacks. Among other things, many consumers or gamblers do not wish to utilize such cards. In that event, however, the casino or retailer does not have an effective means for including the person in a bonusing or promotion program.

From the discussion that follows, it will become apparent that the present invention addresses the deficiencies associated with the prior art while providing numerous additional advantages and benefits not contemplated or possible with prior art constructions.

SUMMARY OF THE INVENTION

The system and method of the present invention generates bonuses and/or promotions based a determination of the number of people and/or their movement within a casino or retail establishment.

A preferred embodiment of the present invention comprises a casino bonusing and promotion system and method wherein collected information regarding a number of people within the casino establishment is input to a rules engine which converts the real-time people counting information into crowd location data and utilizes that information to generate and output bonuses and promotions.

According to another aspect of the invention the system rules engine is integrated with existing systems in order to send the bonus and promotional information to specific locations and/or players (such as specific players, groups of players or players located within certain geographic regions or locations) within the casino establishment or outside the casino using any number of communication technologies such as cellular, phone, cable, and satellite.

In accordance with one embodiment of a system, the system comprises a people counting module which is connected to one or more sensors in order to compile real-time people tracking information. These sensors are configured to detect the presence of people in an area and may include: thermal sensors, wireless beams, directional wireless beams, proximity sensors, heat sensors, RFID sensors, or other available sensors which can detect a person.

The sensors may be located anywhere within the retail or casino establishment and may include a plurality of characteristics such as overhead people detection, directional people counting, integrated wireless and wireless repeaters, battery or AC powered, variable width detection, outdoor people detection, local count display, and other characteristics which facilitate the detection and collection of people within a specific physical area such as a casino, retail location and the like.

According to another aspect of the present invention, raw people detection information is compiled from a network of sensors within a specific location in order to determine the numbers of people within specific areas of the location. The information is further communicated to existing retail or gaming systems either in compiled form or the information is sent to the systems rules engine where specific bonuses and promotions may be communicated via the local systems to kiosks, gaming machines, displays, PA systems, ticket redemption machines, and other existing hardware devices connected to the internal establishment systems.

According to another aspect of the present invention, specific bonuses and promotions are set up by the operator using the system to be routed to specific systems within the establishment based on the criteria set within the systems rules engine.

According to another aspect of the present invention, the method further comprises communicating raw, compiled or processed people cont information to local systems to facilitate the process of patron bonusing and promotions.

According to another aspect of the present invention, the method further comprises: (1) collecting a real-time count of people within one or more locations; (2) compiling people count information; (3) using a rules engine to determine bonuses, promotions, locations, systems, and/or players; and (4) routing output of rules engine to existing systems within the casino or retail location.

According to another aspect of the present invention, the method further comprises generating bonuses and promotions based on people count information.

According to another aspect of the present invention, the method further comprises: (1) counting people; (2) determining bonus and promotion triggers; (3) executing one or more bonuses or promotions based on triggers; and (4) communicating with existing systems to award bonuses and promotions.

According to another aspect of the present invention, the method further comprises progressive bonuses and promotions based on the number of people within one or more locations within a retail or casino location.

According to another aspect of the present invention, the method further comprises progressive bonuses and promotions funded by contributions made by people within one or more locations within a retail or casino location.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3 is a block diagram of Rules Engine inputs and output to one or more systems, interfaces or the like.

FIG. 4 is a block diagram of application embodiments comprising types of retail locations.

FIG. 7 is an example of a bonus and promotion configuration file stored on and used by described system.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises a bonusing and/or promotion system and method of generating or awarding bonuses and/or promotions. In accordance with the invention, information is collected regarding the number of people at a particular location, such as a retail establishment, or at various areas within such a location. Such information is referred to herein as person detection, crowd or person count, but may be referred to by other terminology. The collected crowd or person count information is used to generate and output bonus and/or promotion events and information, such as by inputting count information to a bonus and/or promotion system's rules engine, which engine provides an output to one or more output devices.

In one embodiment, the bonusing and/or promotion system and method are have particular utility to, and are particularly adapted for use at, a casino location. Such a location may include one or more gaming tables, gaming machines and/or gaming systems at which people may play casino-style games such as slot-type games, table games (such as blackjack, poker, roulette, craps or the like), and/or other games such as, keno, bingo, and the like. Such games are generally played for a wager and offer the opportunity for winnings. The casino gaming location may additionally include facilities such as a buffet, restaurants, shops, night clubs, entertainment venues, movie theatres, etc., as well as other associated facilities such as rooms/lodging, a pool, spa or the like.

Figure 6:
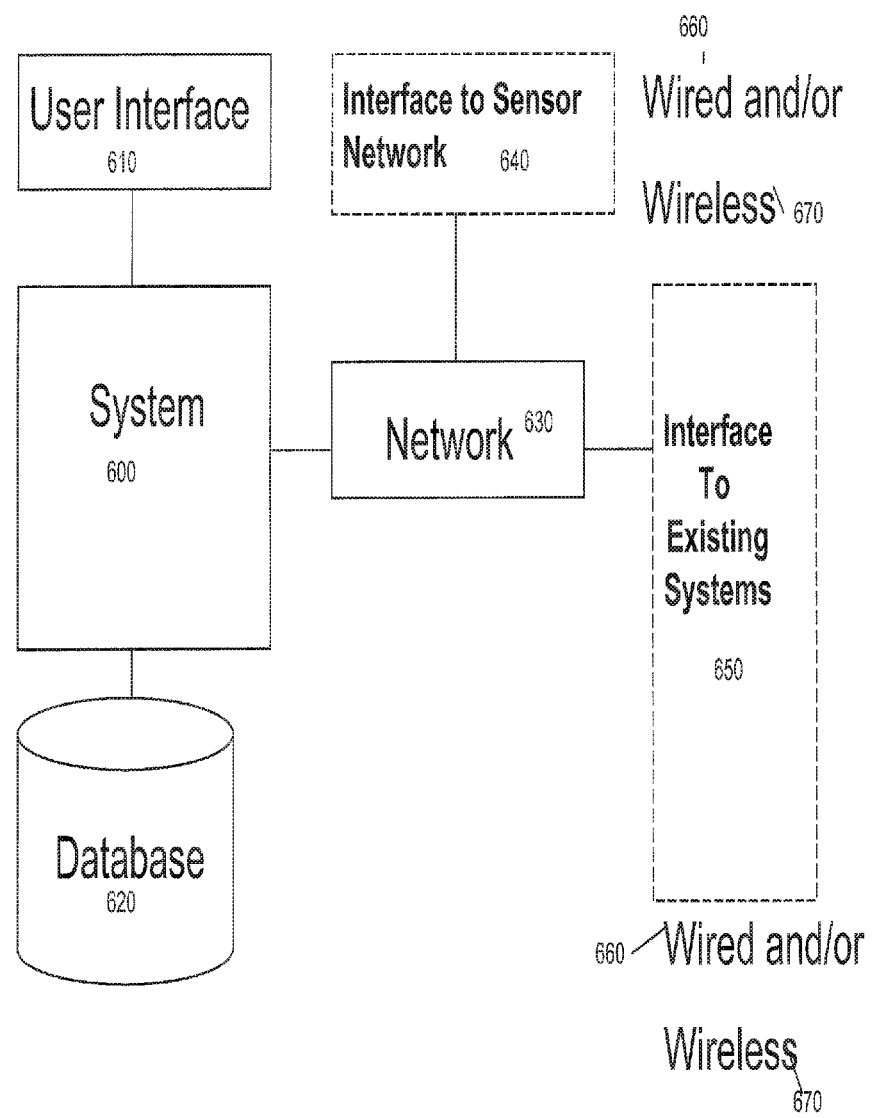
FIG. 6 is a block diagram of the described system.

FIG. 6 is a block diagram which illustrates one embodiment of a system of the invention. As illustrated, the invention comprises a main system 600 (such as the people traffic system 110 described below relative to the casino embodiment illustrated in FIG. 1) which may comprise a server or an application controller system, a user interface 610 to such a system (such as one or more kiosks, computers or the like, such as having displays and keyboards), a database 620 (such as containing bonus or promotion configuration data as described below relative to FIG. 7), a network 630, an interface to a sensor network 640 (such as the sensor network illustrated in FIG. 2 and described below), an interface to existing systems 650 (such as the people traffic system 110 described below relative to the casino embodiment illustrated in FIG. 1), a wired communication interface 660, and a wireless communications interface 670, the function of which elements are further described.

Figure 1:
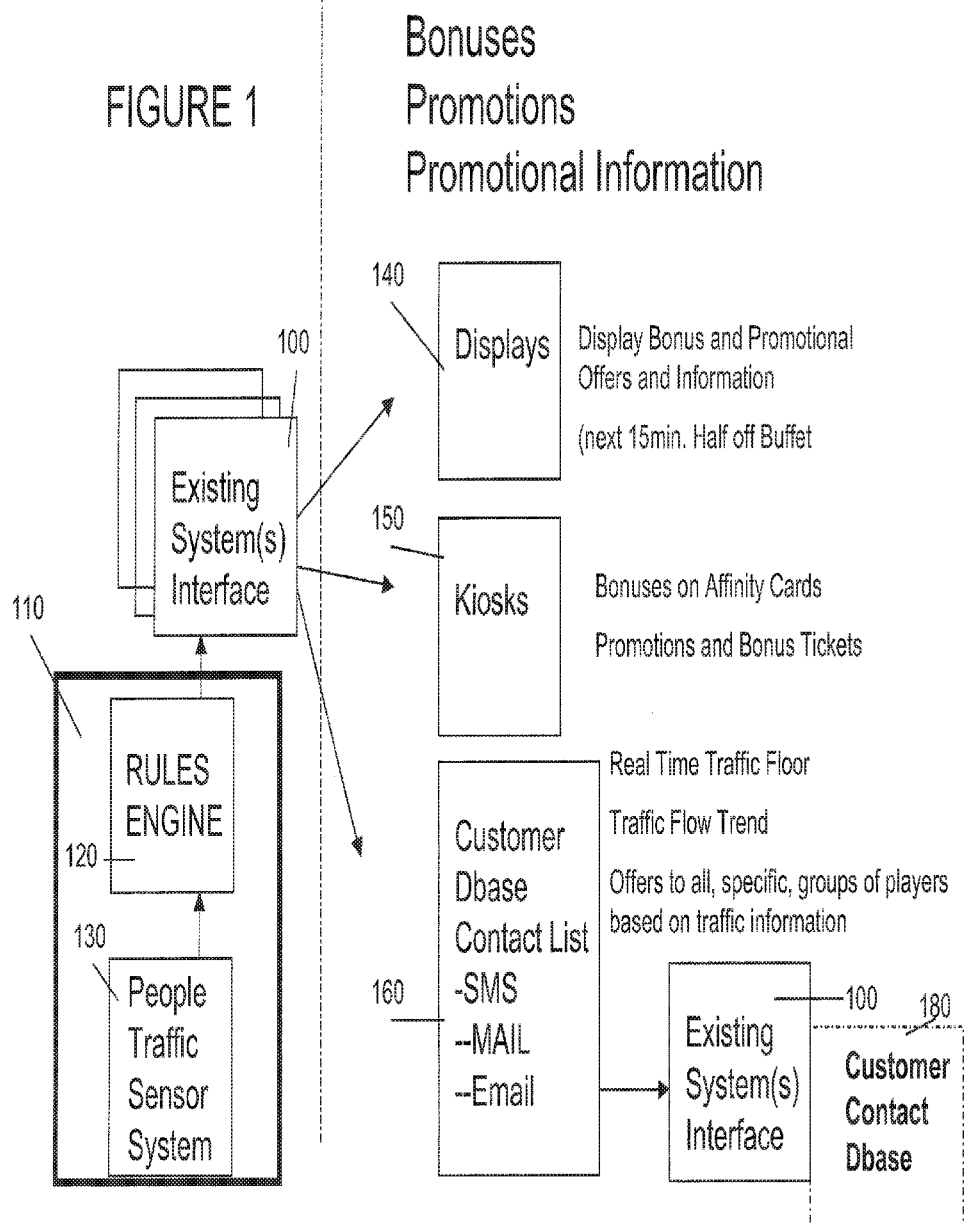
FIG. 1 is a block diagram of a gaming system for awarding payouts and prizes, the system being modifiable to include people counting and rules engine as proves necessary for implementing the various embodiments of the present invention.

FIG. 1 illustrates a block diagram of the invention as applied to a casino environment. As illustrated, a gaming system for awarding payouts and prizes exists in a casino. Existing systems of the casino are preferably adapted to include an interface 100 to a people traffic system 110 of the invention. The people traffic system 110 preferably comprises: (1) a sensor system 130 for sensing the presence of people in one or more areas; and (2) a rules engine 120 for implementing the various embodiments of the present invention. The rules engine 120 preferably comprises a means for generating bonus or promotion information. Such means may comprise a controller, such as a server or other computing device, which executes instructions or "rules" based upon provided data. As indicated below, a variety of information, including criteria regarding various bonuses or promotions, may be stored in a database. Data or inputs provided to the rules engine 120 preferably include information regarding a "person count" or the detected presence of one or more persons in a particular location.

In the casino location embodiment of the invention, the people traffic system 110 integrates with various output devices, thus permitting bonus and/or promotion information to be provided to people in the casino. Such output devices may comprise, for example, existing displays 140 and existing kiosks 150 in the casino location. The system 100 may also interface with existing customer databases 160, such as those which are well known as databases associated with existing customer loyalty systems of casinos. The people traffic system 110 may interface with these various devices, databases and the like by one or more system interfaces 100.

According to another aspect of the invention the system rules engine 120 is integrated with existing system interfaces 100 in order to output bonus and/or promotional information based on the number of people within a casino or within specific locations of the casino (such as targeted quadrants within the casino or outside the casino) via displays 140, kiosks 150, or other devices configured to provide a visual and/or audible output. Such interfaces 100 may include a communication interface, whereby the system 110 may communicate with such other devices using any number of communication technologies and by any number of communication links, such as cellular, phone, cable, and satellite.

In another embodiment adapted to a casino location, bonus and/or promotional information is output from the people traffic system 110 to existing casino customer contact systems 160 and/or databases 180 for targeting to one or more customers. Such customers may include at least one or more specific customers, groups of customers or customers located in specific geographic regions or locations, such as for enticing those customers to visit targeted quadrants within the casino location, and wherein customers may include casino game players, buffet customers, bingo players, keno players, table game players, theatre customer, entertainment customers, and the like wherein the contact is made to the player via their email, cell phone, etc. and not specifically within via the devices within the casino.

Figure 2:
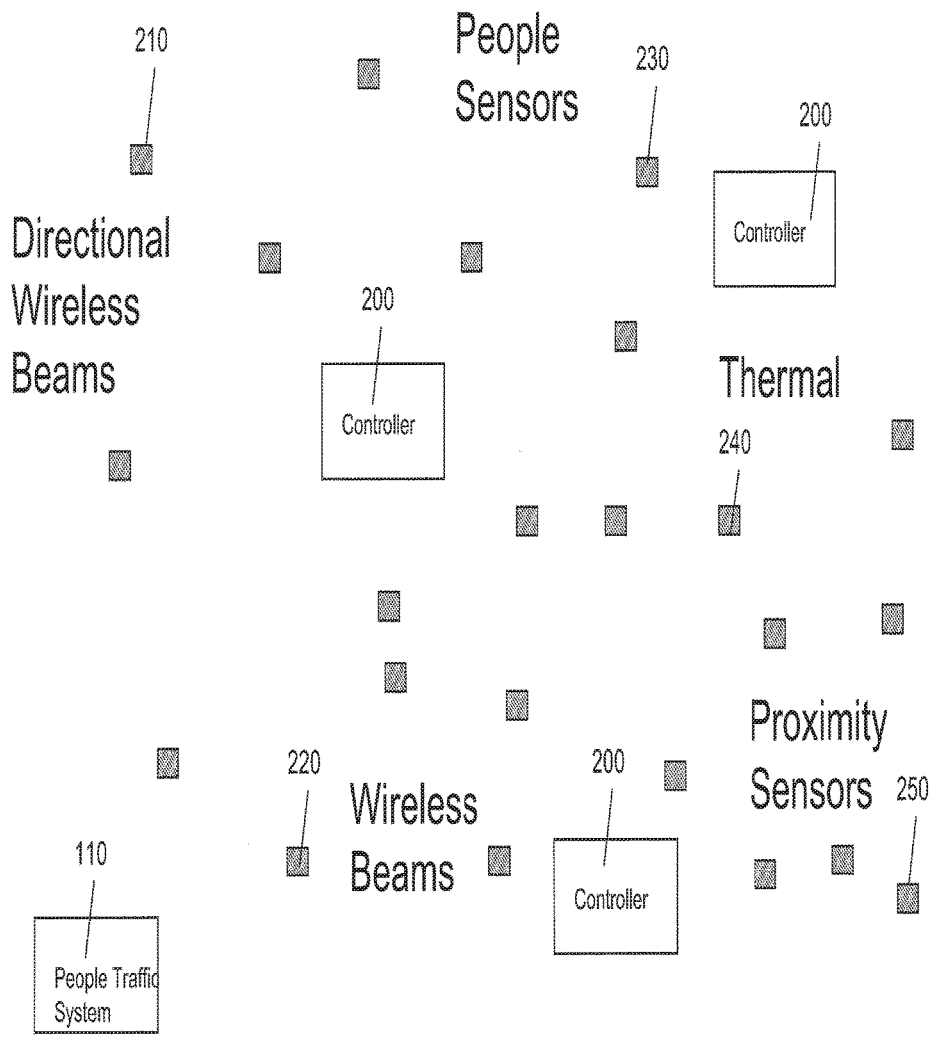
FIG. 2 is a block diagram of a one or more sensors and sensor types within a location connected to one or more data collection controllers for the collection of raw people counting data.

As indicated above, in one embodiment the invention includes a sensor system 130. Referring to FIG. 2, such a system comprises means for sensing or detecting persons at a location, and preferably means which permit or provide an identification or count of the number of persons at a location. The means may comprise one or more sensors of one or more sensor types within a location. Such a location may comprise a casino or other retail establishment, for example. In one embodiment, the sensors are connected to one or more data collection controllers for the collection of raw people counting data. In particular, as illustrated, people counting module controllers 200 of the described people traffic system 110 connect to one or more sensors 210, 220, 230, 240, 250, and other sensors adapted to detect the presence of one or more persons in order to compile real-time people tracking information within a specific location and/or one or more areas within such a location, such as a casino.

In the preferred embodiment, the one or more sensors may comprise, but are not limited to one or more of the following types of sensors: thermal sensors 240, wireless beams 220, directional wireless beams 210, proximity sensors 250, RFID sensors 230, or other sensors now known or later developed which are capable of being used to detect the presence of at least one person in a location. The one or more sensors might also comprise cameras or other devices configured to capture information from which a person count may be determined.

The one or more sensors may be located anywhere within the specific location, such as the described casino, and may include a plurality of characteristics such as overhead people detection, directional people counting, integrated wireless and wireless repeaters, battery or AC powered, variable width detection, outdoor people detection, local count display, and other characteristics which facilitate the detection and collection of people within a specific physical area such as a casino, retail location and the like. It will be appreciated that a plurality of sensors may be utilized in order to provide people detection over a large area.

Figure 5:
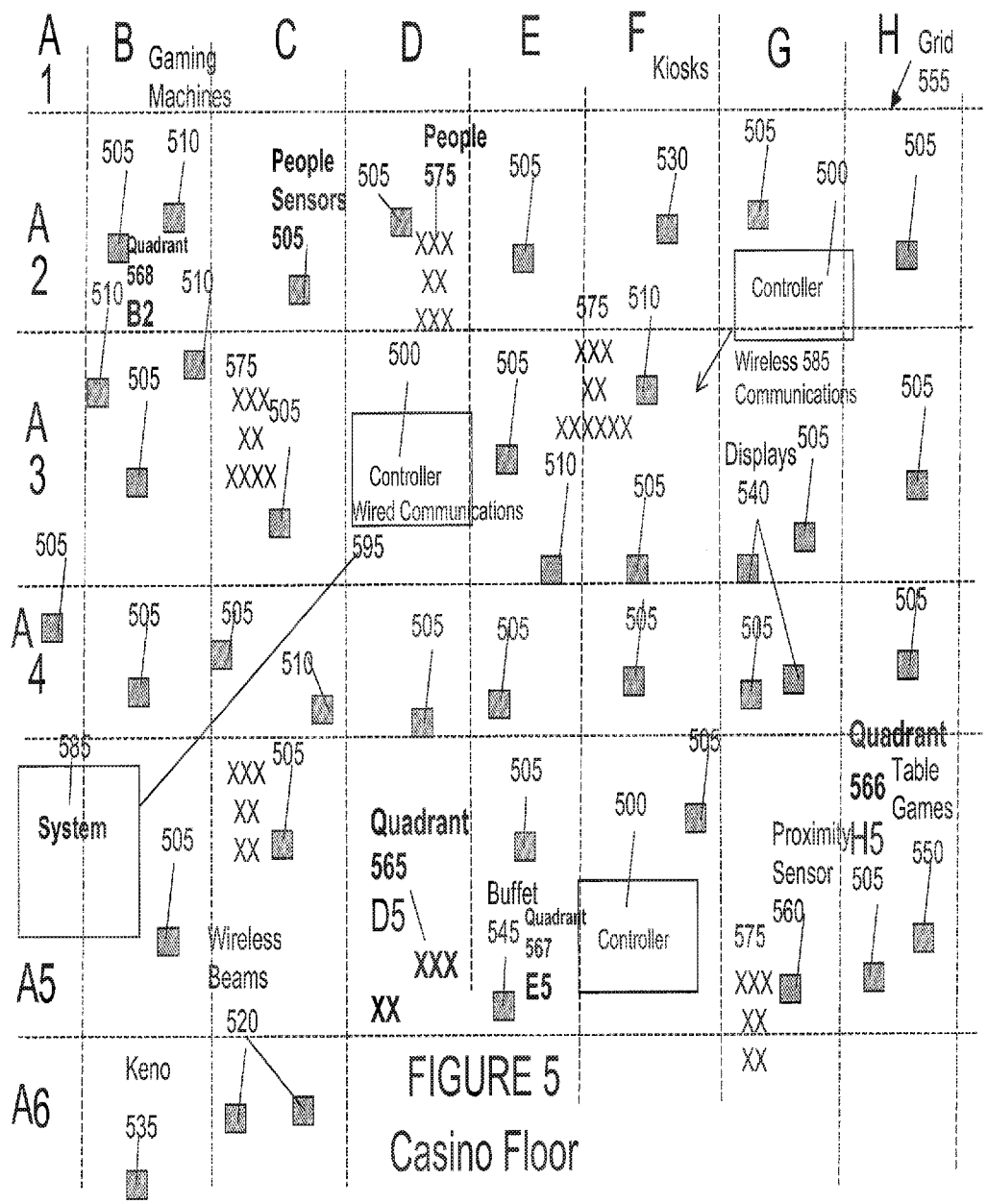
FIG. 5 is a schematic of a casino floor broken into a grid of location quadrants.

As indicated above, in one embodiment of the invention people count information may be obtained for various areas of a location. For example, according to one aspect of the present invention, a location may be organized in location quadrants, areas or zones (the areas may have designated shapes or be irregular in shape, have the same or different sizes or the like). FIG. 5 illustrates a casino floor which has been organized into a grid 555 of location quadrants or areas 565. In accordance with one embodiment of the invention, the people traffic system 110 collects raw people detection information, also known as traffic information, such as from a network of sensors 505, wherein information from each sensor 505 or grouping of sensors within a specific quadrant is collected and communicated over wire and/or wireless communications to a controller 500, a casino gaming system 585, or any combination thereof. The raw people count information is collected by system 585 in order to determine the numbers of people within specific quadrants of the particular location, such as a casino location.

In one embodiment, the collected traffic information may comprise data pertaining or relating to the number of people within the range of the sensor(s), the rate of movement of people detected by the sensor(s), the status of people detected by the sensor(s) (such as moving, still, assembling, etc.), and other related data pertaining or relating to the numbers, groups and movement of people detected by sensor(s) 505. It will be appreciated that the one or more sensors may simply provide a raw output which is provided to main controller, which main controller utilizes the raw output to generate person count information. For example, a reflectivity sensor might output an analog signal wherein high values represent high reflectivity, and thus presence of a person, while a low value represents low reflectivity. The controller might analyze that signal to determine the number of high values, and thus the number of detected persons, over a period of time. Alternatively, the sensors may include controllers or processors which manipulate the sensor outputs into information regarding a number of detected persons.

For example, in one embodiment, one or more sensors may collect information which identifies that five people are located on the casino floor in quadrant D5 shown in FIG. 5. Once a determination has been made as to the number of people within the given quadrant D5 (or set of quadrants including D5), that information may be used to determine bonuses and/or promotions, including the type and nature thereof and to whom the bonuses and/or promotions may be directed. For example, a casino may desire to entice the people in quadrant D5 to move to a targeted quadrant, such as quadrant H5 566. In order to entice the people located in quadrant D5 to move to the targeted quadrant H5, information such as special promotions or bonuses may be directed to the people in quadrant D5. For example, a visual and audio promotion indicating the availability of two-for-one casino chips for all table games played within quadrant H5 566 for the next 30 minutes may be routed to one or more displays, speaker systems, gaming machines, gaming machine displays, billboard displays, and/or is communicated as vocal announcements within quadrant D5 565.

As another example, one or more sensors 505 associated within quadrant E5 567 may be used to detect how many people are presently in a buffet 545. When the number of people reaches a predefined threshold, such as 87 people, a promotion may then be directed to displays within the buffet 545. Such a promotion may be used, for example, to entice people to play casino gaming machines 510 within quadrant B2 568.

The various types of bonuses and/or promotions which may be offered in accordance with the invention may vary. The bonuses and/or promotions may offer free or reduced price goods or services, including free or reduced price game play. The various bonuses and/or promotions may be offered in various combinations, including based upon particular locations or areas. For example, any number of promotions may be offered to people within specific quadrants or groups of quadrants, such as two-for-one, fifty percent off, $5 cash back, free play, free buffet, etc. Any number of bonuses may be offered to people within specific quadrants or groups of quadrants for example $5 bonus for all aces, 10× pay for any royal flush, $100 bonus for first person to win a royal flush, lucky card bonus, etc.

The various bonuses and/or promotions may be used for various purposes. As indicated, the bonuses and/or promotions might be used to drive or entice people to move from one location or area to another. According to another aspect of the present invention, detection of specific numbers of people may qualify the people in an area (such as a quadrant) for any number of bonuses, promotions or both.

Figure 3:
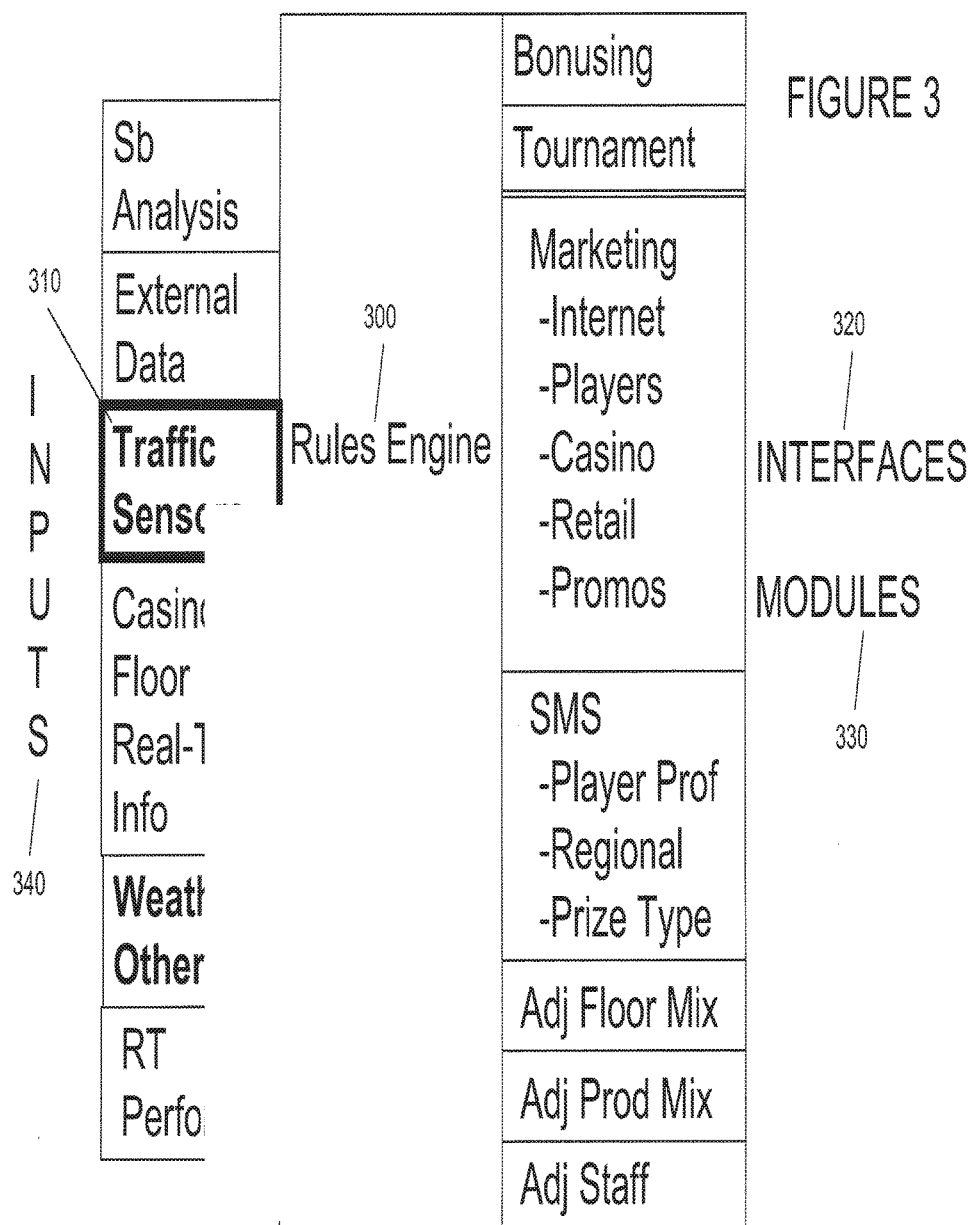

FIG. 3 illustrates additional details of the rules engine 120 illustrated in FIG. 2. As illustrated in FIG. 3, the rules engine may accept various inputs and use those inputs to generate various outputs to one or more existing systems, interfaces or the like. In one embodiment, people or traffic information collected by traffic sensors 310 is further communicated to existing retail or gaming system modules 330 either in compiled form for processing by external systems, or the traffic information is sent to the people traffic system rules engine 300 where specific bonuses and promotions may be communicated via existing system interfaces 100 shown in FIG. 1 in order to send promotional and/or bonus information from the people traffic system to kiosks 150, gaming machines, displays 140, PA systems, ticket redemption machines, and other existing hardware devices connected to the internal establishment systems.

According to another aspect of the present invention wherein the system is associated with a casino location as shown in FIG. 3, specific bonuses and/or promotions are set up by the operator using the described system to be routed to specific system modules 330 within the casino location based on the criteria set within the systems rules engine 300.

Such bonuses and promotions may be predefined using a software program with a database interfaced to an existing system such as a casino gaming system and triggered in real-time when people sensors 505 detect a specific number of people within one or more quadrants, as indicated above relative to FIG. 5.

As described earlier, the purpose of the bonuses and/or promotions may be to move people from one quadrant or area to another quadrant or area. The purpose of said bonuses and/or promotions may be directed to people within a specific quadrant or area for any number of reasons based on the desires of the casino or retail establishment. In one embodiment, traffic or people count information from two or more quadrants or areas may be used to generate or trigger a bonus or promotion. For example, a bonus or promotion may be generated when the system determines that the person count in one quadrant reaches a predetermined high level when at the same time a person count in another quadrant reaches a predetermined low level.

According to another aspect of the invention, a bonus and/or promotion may be directed inversely to all quadrants or areas except for a specific quadrant where people are located. For example, if a large number of people are determined to be loitering within quadrant H5 566 watching table games, a promotion and/or bonus may be offered to quadrants around H5 566, but excluding H5 566, in order to entice some persons in quadrant H5 566 to move to another quadrant.

Additional, for example, there may be a large number of players playing $1 table games. The casino may desire to drive those players to the $10 dollar table games by offering a promotion using displays within a quadrant containing $1 table games of two-for-one play on all $10 tables within an adjacent quadrant.

According to another aspect of the invention shown in FIG. 6, the configuration of the sensors, bonuses, promotions, and related information is defined within a configuration file stored on a database 620 associated with the people traffic system 600.

As indicated above relative to FIG. 1, a rules engine 120 may be utilized to generate various bonuses and/or promotions based upon various inputs, including person count information for one or more areas. In one embodiment, the rules engine 120 may implement such features using one or more configurations files 700, one example of which is illustrated in FIG. 7. As illustrated, the configuration file 700 may comprise a table of bonuses or promotions and their associated elements or criteria, such as: (1) "originating" quadrants 710 where sensors detect the numbers of people; (2) the sensors 720 associated with that the originating quadrant 710; (3) one or more promotions 730 and/or bonuses 740 to be output; (4) a description 750 of the bonus and/or promotion event; (5) the time 760 at which the bonus and/or promotion is to be awarded or activated; (6) the duration or activation time 770 of the bonus and/or promotion; and (7) the destination quadrant 780 where the bonus and/or promotion is active.

In the configuration illustrated in FIG. 7, when the value of the "destination" quadrant 780 is none, the bonus and/or promotion may be awarded within the originating quadrant 710. It will be appreciated that numerous other data elements used to configure the system 600 may also be included within the system configuration file and the configuration file may include additional external files and include references to external tables containing additional detailed information regarding bonuses, promotions, time, and the like associated with the people traffic system.

From FIG. 7 it will be appreciated that bonuses or promotions may vary over time, including based upon changes in the number of people in certain areas. For example, in the evening at a casino a large number of persons may be detected as playing table games in one area and the casino may desire to entice some of those players to slot machines in another area. On the other hand, in the afternoon a large number of persons may be detected as playing the slot machines and the casino may desire to entice some of those players to the table games.

According to another aspect of the invention, the promotions and bonuses may be time oriented whereby once they are triggered, the bonus or promotion may exist or remain active for a predefined period of time within a particular quadrant of group of quadrants. The triggers and timing may be pre-established to a desired configuration defined by the parameters stored within the system's database and executed by the system automatically when the system is operating.

According to another aspect of the present invention, the method further comprises communicating raw, compiled or processed people count information to local systems to facilitate the process of patron bonusing and promotions.

According to another aspect of the present invention, the method further comprises: (1) collecting a real-time count of people within one or more locations; (2) compiling people count information; (3) using a rules engine to determine bonuses, promotions, locations, systems, and/or players; and (4) routing output of rules engine to existing systems within the casino or retail location.

According to another aspect of the present invention, the method further comprises generating bonuses and promotions based on people count information.

According to another aspect of the present invention, the method further comprises: (1) counting people in a location or one or more areas of a location; (2) determining bonus and promotion triggers; (3) executing one or more bonuses or promotions when such triggers are met; and (4) communicating with one or more systems (preferably existing systems) to award bonuses and promotions.

According to another aspect of the present invention, the method further comprises progressive bonuses and promotions based on the number of people within one or more locations within a retail or casino location.

According to another aspect of the present invention, the method further comprises progressive bonuses and promotions funded by contributions made by people within one or more locations within a retail or casino location.

As illustrated in FIG. 4, the invention may be implemented in various locations, including various retail locations such as, but not limited to, a casino location, a casino gaming floor, a retail shop, an indoor mall, a super store, a carnival, an outdoor mall, a fun store video and other games, and other locations which offer products or services to consumers.

Further, while various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method of providing a progressive bonus comprising:
   providing at least one sensor configured to detect the presence of at least one person in a first area of a plurality of areas at a location;
   transmitting an output of said at least one sensor through a network to a progressive bonus generator comprising at least one server that includes non-transitory machine readable instructions for generating a progressive bonus and a database that includes progressive bonus configuration data;
   increasing a progressive bonus amount when at least one person is detected in said first area of said location,
   generating at said at least one server a bonus award comprising at least a portion of said progressive bonus amount; and
   transmitting from the server via the network information regarding said bonus award to at least one display device of said location.

2. The method in accordance with claim 1 wherein said location comprises a casino.

3. The method in accordance with claim 1 wherein said at least one display comprises a video display or an audio device.

4. The method in accordance with claim 1 wherein said at least one sensor is selected from the group consisting of: a thermal sensor, a wireless beam sensor, a proximity sensor, and an RFID sensor.

5. The method in accordance with claim 1 wherein said bonus award is generated when said number of persons is above a predetermined threshold.

6. The method in accordance with claim 1 wherein said bonus award is generated when said number of persons is below a predetermined threshold.

7. The method in accordance with claim 1 further comprising the step of compiling information from said at least one sensor to generate information regarding said number of persons in said first area.

8. The method in accordance with claim 1 wherein said bonus award is only redeemable at a second area of said location.

9. The method in accordance with claim 1 wherein said bonus award is generated randomly via a trigger based on said number of persons above a predetermined threshold causing said bonus award to be awarded at a designated location.

10. A system for providing a progressive bonus comprising:
    at least one sensor configured to detect the presence of at least one person, said at least one sensor located in a designated location;
    a progressive bonus system server, said server comprising a processor, at least one non-transitory computer readable medium storing machine readable instructions to generate a progressive bonus, and at least one database of progressive bonus information;
    a first communication link between said at least one sensor and said progressive bonus server, an output of said at least one sensor being provided to said progressive bonus system server via said first communication link; and
    at least one second communication link between said progressive bonus system server and at least one existing system at said location,
    said progressive bonus system server being configured to generate a progressive bonus dependent upon at least a number of persons detected in at least one area of said location as detected by said at least one sensor and received via said first communication link, and
    information regarding said generated progressive bonus is provided to said at least one existing system via said at least one second communication link.

11. The system in accordance with claim 10 wherein said at least one database defines at least one progressive bonus based upon a number of sensed persons.

12. The system in accordance with claim 11 wherein said number of sensed persons comprises a number of sensed persons above a threshold number.

13. The system in accordance with claim 11 wherein said number of sensed persons comprises a number of sensed persons below a threshold number.

14. The system in accordance with claim 10 wherein said at least one existing system comprises a system which includes at least one video display.

15. The system in accordance with claim 10 wherein said at least one existing system comprises a gaming system comprising a plurality of gaming machines.

16. The system in accordance with claim 10 wherein said at least one existing system comprises a table gaming system comprising a plurality of table games.

17. The system in accordance with claim 10 wherein said progressive bonus comprises a randomly generated trigger based on the number of persons above a predetermined threshold causing said progressive bonus to be awarded at a designated location.

* * * * *